April 1, 1952 A. N. COSKEY ET AL 2,590,943
FOUNTAIN PEN
Filed May 6, 1947
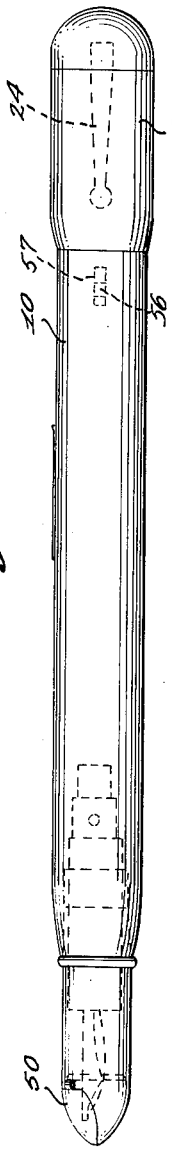
INVENTORS
ALEXANDER N. COSKEY AND
OTTO E. ERIKAINEN
BY
McMorrow, Berman & Davidson
ATTORNEYS Patented Apr. 1, 1952

2,590,943

UNITED STATES PATENT OFFICE 2,590,943

FOUNTAIN PEN

Alexander N. Coskey, Mattawan, Mich., and Otto E. Erikainen, Chicago, Ill.

Application May 6, 1947, Serial No. 746,182

1 Claim. (Cl. 120—48)

This invention relates to fountain pens, and has particularly reference to a fountain pen that when not in use is leak-proof and fully enclosed and that by a single movement can be presented to operative writing position.

The accompanying drawings illustrate a preferred embodiment of the invention, but it should be understood that modifications may be made therein without departing from the spirit of the invention as hereinafter claimed.

Figure 1 is a side elevation of the new and improved fountain pen in closed position.

Figure 2 is a vertical longitudinal section through the pen when in writing or open position.

Figure 3 is a side elevation of the pen with the outer barrel removed.

Figure 4 is a front elevation of Figure 1, taken from the left.

Figure 5 is a side elevation of a sleeve member and spring used to operate the dust cover for the pen point.

Figure 6 is a perspective view of the spring used with the sleeve of Figure 5.

Figure 7 is a vertical transverse section taken along line 7—7 of Figure 2.

Figure 8 is a vertical transverse section taken along line 8—8 of Figure 2.

Figure 9 is a vertical transverse section taken along line 9—9 of Figure 2.

Figure 10 is a vertical longitudinal section of the rear cap that operates the pen.

With reference to the drawings, the pen comprises an outer barrel 10 in which a sleeve 12, preferably of metal, is adapted to slide longitudinally. Within the sleeve 12 is a cylindrical holder 14 having a reduced portion at the posterior end on which a rubber sac 16 is secured. A pen point 18 and an ink feed bar 20 are fastened to the anterior end of the holder 14. The sleeve 12, holder 14, sac 16, point 18, and feed bar 20 are adapted to move as a unit, in a manner to be more fully described hereinafter.

The posterior end of the barrel 10 has secured to it a cap 22, which carries the usual clip 24. This cap 22 is splined in an annular groove 26 in the barrel 10, to constrain the cap 22 in rotary movement with respect to the barrel 10. The cap 22 may have a removable top 26' threaded thereto, to facilitate repair. The cap 22 is thus mounted on the outer barrel 10 for rotation and held against sliding movement longitudinally thereof.

The intermediate portion of the cap 22 is provided interiorly thereof with a nose 28. This nose is adapted to ride in a helical groove 30 in the adjacent portion of one end of the sleeve 12, this end portion of the sleeve 12 projecting beyond an end of the barrel 10, as is illustrated in Figure 2. Consequently rotation of the cap 22 on the barrel 10 will serve to slide the sleeve 12 and the members carried thereby longitudinally within the barrel 10.

The sleeve 12 is provided with a longitudinally extending opening 32, and an ink-filling lever 13 is pivoted on the barrel 10 in such a way as to be engageable through the opening 32 in the sleeve 12 to contact the rubber sac 16 for the purpose of filling it.

The holder 14 has a central passageway 35 opening at one end to the pen point 18. At the other end, the passage 35 terminates in a lateral opening or valve 36 that joins with a longitudinal surface groove 37 in the portion of the holder 14 that is normally enveloped by the mouth of the rubber sac 16. The groove 37 is of sufficient depth to permit ink to flow from the sac 16 through the groove 37, the valve 36 and the passageway 35, and thence to the pen point 18.

From a position adjacent one end of the sleeve 12 there is struck therefrom a tongue 40 having a bell-shaped tip 41. The tongue 40 is swingably connected, at one end, to the sleeve 12 for limited hinged movement for opening or closing the valve 36. The intermediate portion of the tongue 40 is bent up to form a cam 42. When the sleeve 12 is slidably moved to the closed, retracted position, the cam 42 on the tongue 40 will bear against an internal ledge, or cam engaging member 43 in the barrel 10, whereby the tongue 40 is depressed to press the tip 41 of the tongue 40 into the groove 37 in the holder 14 to close the valve 36 and consequently interrupt the flow of ink to the point 18.

A dust cover 50 is hinged to a pin 51 at the front end of the barrel 10. An overlapping spring 53 is designed to have its front ends fastened to the dust cover 50 and its rounded rear portion secured on the holder 14, so that forward motion of the holder 14 with respect to the barrel 10 will force the spring 53 against the dust cover 50 to open the latter on its hinge pin 51. If desired, this spring 53 may be held in a small sleeve 52 which is then secured to the front portion of the holder 14, it being only necessary that the round portion of the spring 53 be anchored to the holder or any other member that is slidable therewith relative to the barrel 10.

The front end of the barrel 10 has a portion 55 that is complementary to the dust cover 50 in its closed position, to form a dust-proof enclosure for the point 18.

For slidably securing the sleeve 12 in the barrel 10 and holding the sleeve against rotation, a pin member 56 is carried by the barrel 10, on the inner side thereof and engages in a longitudinally extending slot 57, formed in the sleeve 12, and clearly noted in Figures 1, 2 and 9 of the drawings.

The pen operates as follows:

With the pen in the closed position, as shown in Figure 1, it is only necessary to twist the cap 22 with respect to the barrel 10. The nose 28 on the cap 22 will ride in the groove 30 to force the sleeve 12 forwardly. The position of the tongue 40 will be such that the tip 41 thereof is released, away from the valve 36 in the holder 14, opening the way for ink to flow from the sac 16 to the pen point 18. At the same time, the spring 53 will open the cover 50, so that the pen is completedly ready for writing.

In closing the pen, the user twists the cap 22 in the opposite direction. The dust cover 50 will be closed and the tongue 40 will be operated to dam the ink conduit. As a result, the pen will be leakproof and completely enclosed when in the retracted position.

What is claimed is:

In a fountain pen having a barrel and a sleeve slidable in the barrel from a retracted position within the barrel to an extended position, a pen point supporting member on one end of the sleeve formed with a laterally opening passage therein, an ink sac mounted on said pen point supporting member and having one end overlying said opening and spaced therefrom in the extended position of the sleeve, a tongue swingable on said sleeve and extending longitudinally thereof, a tip on said tongue overlying said opening biased upwardly therefrom in the extended position of the sleeve, a cam on said tongue, a cam engaging member on the barrel engageable with said cam in the retracted position of the sleeve for depressing said tip to engage the sac and hold it in closing position relative to said opening, and means rotatable on the barrel engaging the sleeve for selectively extending and retracting the sleeve.

ALEXANDER N. COSKEY.
OTTO E. ERIKAINEN.

REFERENCES CITED

The following references are of record in the file of this patent:

UNITED STATES PATENTS

| Number | Name | Date |
|---|---|---|
| 1,775,068 | Debenedetti | Sept. 2, 1930 |
| 1,812,229 | Whitehead | June 30, 1931 |
| 1,923,634 | Markstein | Aug. 22, 1933 |
| 1,949,201 | Friedman | Feb. 27, 1934 |
| 2,291,859 | Andrews | Aug. 4, 1942 |
| 2,304,229 | Andrews | Dec. 8, 1942 |
| 2,416,112 | Moore | Feb. 18, 1947 |
| 2,454,086 | Randolph | Nov. 16, 1948 |

FOREIGN PATENTS

| Number | Country | Date |
|---|---|---|
| 109,863 | Great Britain | 1917 |
| 616,460 | Germany | July 29, 1935 |